April 6, 1937.  W. H. FEENEY  2,076,179
MACHINE TOOL
Filed June 10, 1936  2 Sheets-Sheet 2

Witness
Charles T. Olson

Inventor
William H. Feeney
by Fish Hildreth
Cary & Jenney Attys

Patented Apr. 6, 1937

2,076,179

UNITED STATES PATENT OFFICE 2,076,179

MACHINE TOOL

William H. Feeney, East Providence, R. I., assignor to Brown and Sharpe Manufacturing Company, a corporation of Rhode Island Application June 10, 1936, Serial No. 84,469

7 Claims. (Cl. 51—166)

The present invention relates to improvements in machine tools of that general description which comprise a work support and a vertically adjustable column support for a rotary tool spindle.

More specifically, the invention relates to the provision in a machine of this general description, of a novel slide support for the vertically adjustable column which will have the required rigidity and which will permit of a rapid and accurate assembly of the machine to produce work of the required accuracy without the necessity of the usual time consuming and expensive operations of truing and adjusting the slide support on its ways, and will permit the convenient tightening and adjustment of the sliding parts to compensate for wear, or the replacement of such parts with a minimum of time and expense.

In machines of this general description, it is of prime importance that the sliding support for the vertically adjustable column be fitted to operate in precisely the plane for which it is designed, and more particularly that the angular position of the column about a vertical axis be accurately determined with relation to a movable work support to insure the required degree of accuracy in operation of the machine. This accuracy has in the past been obtained only through the use of guideways comprising flat guiding surfaces which prior to the assembly of the machine must be re-aligned and all parts thereof brought into the desired plane by highly skilled and expensive scraping operations.

In carrying out the present invention, applicant has provided a slide support comprising two vertically movable cylindrical shafts which are supported in bearings in the machine base, and on which the machine column is mounted to permit a slight relative adjustment in the angular position of the column about a vertical axis, so that in setting up the machine, the column may be quickly and accurately brought into proper alignment with the other machine parts regardless of any slight inaccuracies which may have developed in the construction or assembly of the several parts of the machine.

Figure 1:
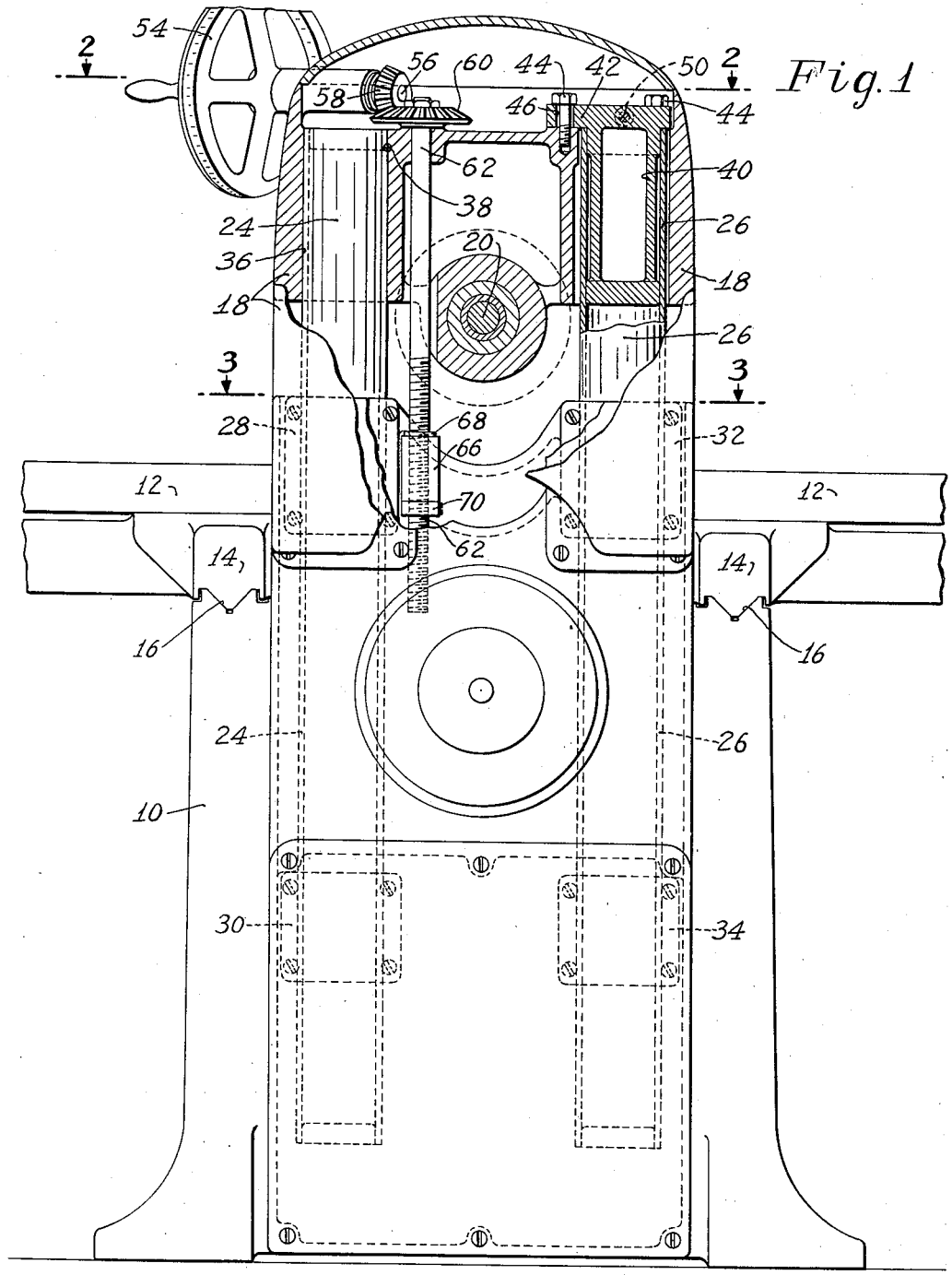
Figure 2:
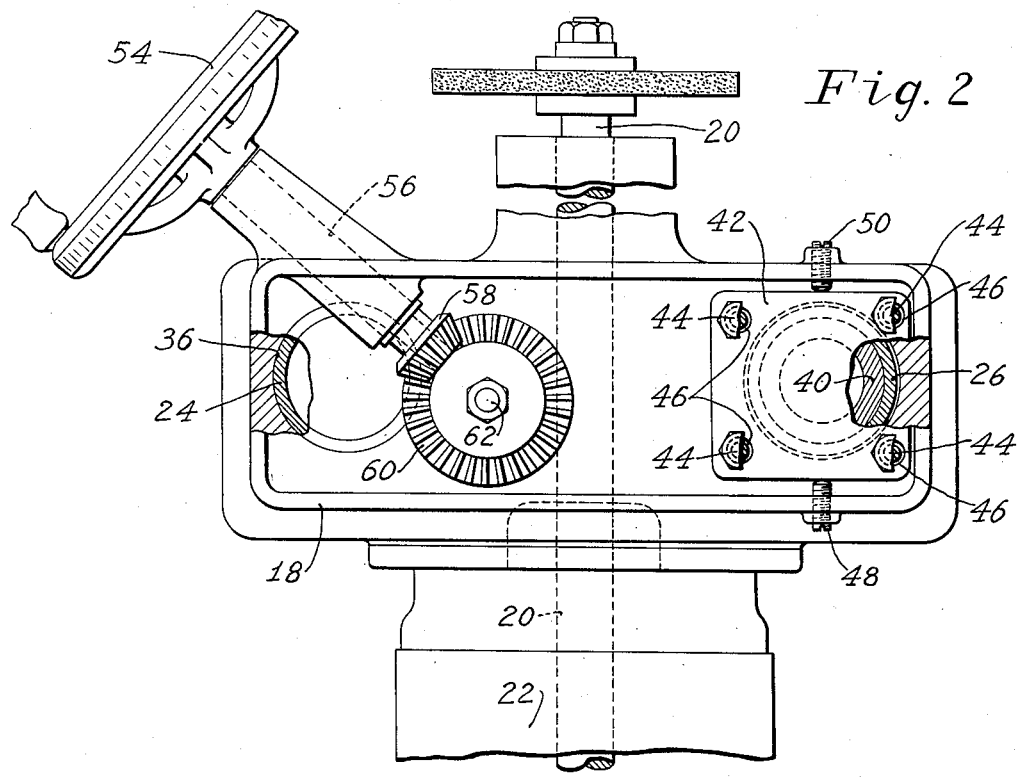
Figure 3:
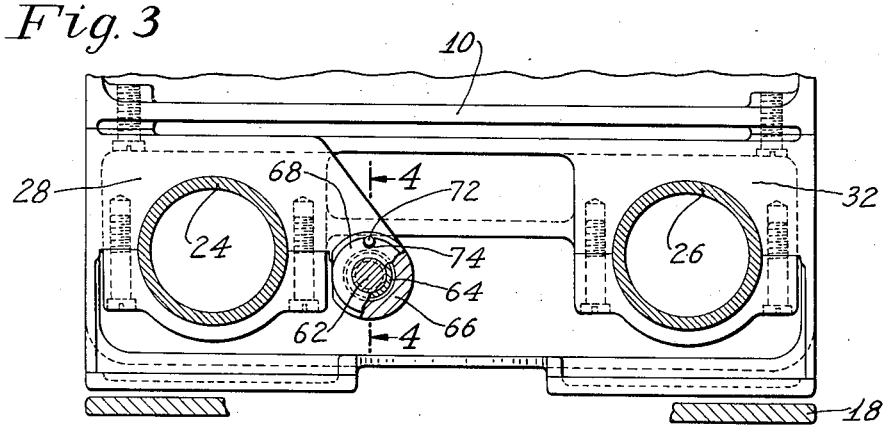
Figure 4:
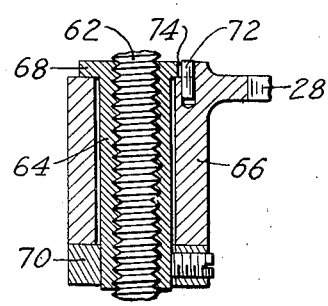

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a view in rear elevation of a grinding machine embodying the several features of the present invention, a portion of the column casing being broken away and certain of the underlying parts being shown in section to illustrate particularly the manner of supporting the column on the vertical posts forming the slide support; Fig. 2 is a sectional plan view taken on the line 2—2 of Fig. 1; Fig. 3 is a sectional plan view taken on the line 3—3 of Fig. 1; and Fig. 4 is a detail sectional view taken on the line 4—4 of Fig. 3, to illustrate particularly the floating construction of the screw and nut for vertically adjusting the position of the column.

The machine herein disclosed as embodying in a preferred form the several features of the present invention, consists in a grinding machine of ordinary description which comprises a base 10, a longitudinally movable work table 12; a saddle member 14 transversely movable on guideways 16, and a machine column 18 on which is mounted a grinding wheel spindle 20. The grinding wheel spindle 20 as best shown in Figs. 1 and 2, is supported to rotate on a horizontal axis, and is driven directly by means of an electric motor 22 mounted on the rear side of the column 18.

In accordance with the present invention, the machine column 18 is mounted on a slide support which comprises two cylindrical posts 24 and 26 slidably supported to move vertically in bearings formed in the machine base, the post 24 being supported by two bearings generally indicated at 28 and 30, and the post 26 being similarly supported by two bearings 32 and 34.

The machine column 18 is provided with a vertically extending cylindrical bore 36 into which the cylindrical shaft 24 is tightly fitted, being rigidly secured thereto by means of a key 38. In order to permit an adjustment of the angular position of the column 18 with relation to the slide support comprising the posts 24 and 26 in setting up the machine, an adjustable connection is provided between the column 18 and post 26. As shown in the figures, this adjustable connection comprises a plug 40 which is tightly fitted into the upper end of the post 26 and has formed on its upper end a square plate 42 which overlies an adjacent portion of the casting of the column 18. The plate 42 and plug 40 are rigidly secured to the column casting by means of four machine screws 44 which are screwed into the casting and extend through slightly enlarged holes 46 formed in the four corners of the plate 42. Adjustments in the angular position of the column 18 with relation to the posts 24 and 26 and the other parts of the machine, may be made by loosening the nuts 44 and allowing the column 18 to swing about the post 24 as a pivot. In order to secure the required delicacy of adjustment and also to assist in maintaining the plate 42 and column 18 in their relative adjusted positions, two stop screws 48 and 50 are screw-threaded into adjacent portions of the casing 18 to bear against opposite sides of the plate 42. In order to secure the required adjustment, it will readily be seen that it is necessary merely to loosen the bolts 44, adjust the position of the set screws 48 and 50, thus causing the casing 18 to swing about its axis on the post 24 the desired extent, and thereafter to again tighten up the bolts 44.

The vertical adjustment of the machine column 18 is effected through connections which include a hand wheel 54 supported on one end of a horizontal shaft 56 on the column 18. A bevel gear 58 on the shaft 56 meshes with a bevel gear 60 on the upper end of a shaft 62 which at its lower end is screw-threaded to receive a nut 64 supported on a stationary portion of the machine. The screw shaft 62 is freely rotatable in bearings in the column 18, but is supported against axial movement with relation thereto in one direction by the engagement of the gear 60 with the gear 58, and against movement in the other direction by the engagement of the gear 60 with the upper surface of the column casting.

In accordance with one feature of the present construction, the nut 64 is constructed and arranged to permit a free lateral movement thereof relatively to the machine frame with the column 18. To this end the nut 64 is loosely fitted into a sleeve 66 formed in a portion of the stationary bearing 28 for the post 24 (see Figs. 3 and 4), being held against axial movement by means of a flange 68 formed on the upper end of the nut 64 which overlies the top of the sleeve 66 and a collar 70 secured to the lower end of the nut 64 and engaging the opposite end of the sleeve 66. In order to prevent rotational movement of the nut, a pin 72 fitted into the upper end of the sleeve 66 is arranged to engage in a corresponding slot 74 formed in the flange 68.

With this construction and arrangement of parts, it will readily be seen that any adjustment of the relative angular positions of the column 18 and slide support comprising the posts 24 and 26, will cause a correspondingly slight adjustment automatically to take place in the position of the nut 64 with relation to the sleeve 66.

It will be understood that the invention is not limited to the specific embodiment shown, and that various deviations may be made therefrom without departing from the spirit and scope of the appended claims.

What is claimed is:—

1. In a machine tool having a base, a work support, a rotary tool spindle and a vertically adjustable column for said spindle, the combination of a slide support for said column comprising two vertically extending cylindrical posts, stationary bearings formed on the base in which said posts are mounted to slide, means for securing the column rigidly to the upper portions of said posts, means for adjusting the position of the column laterally with relation to one of said posts to effect a slight angular adjustment of the column on the base about the vertical axis of the other of said posts, and means under the control of the operator for adjusting vertically the position of the column and posts secured thereto.

2. In a machine tool having a base, a work support, a rotary tool spindle and a vertically adjustable column for said spindle, the combination of a slide support for said column comprising two vertically extending cylindrical posts, stationary bearings formed on the base in which said posts are mounted to slide, means for securing the column to the upper portion of one of said posts, and a supporting connection between the column and the other of said posts adjustable to permit an adjustment in the angular position of the column about the vertical axis of the first mentioned post.

3. In a machine tool having a base, a work support, a rotary tool spindle and a vertically adjustable column for said spindle, the combination of a slide support for said column comprising two vertically extending hollow cylindrical posts, stationary bearings formed on the base in which said posts are mounted to slide, means for securing the column to the upper portion of one of said posts, and a supporting connection between the column and the other of said posts comprising a plug tightly fitted within the top of the other of said posts and having the upper portion thereof flanged to overlie the top of the post, and means for clamping said flanged portion adjustably to the column.

4. In a machine tool having a base, a work support, a rotary tool spindle and a vertically adjustable column for said spindle, the combination of a slide support for said column comprising two vertically extending hollow cylindrical posts, stationary bearings formed on the base in which said posts are mounted to slide, means for securing the column to the upper portion of one of said posts, and a supporting connection between the column and the other of said posts comprising a plug tightly fitted within the top of the other of said posts and having the upper portion thereof flanged to overlie the top of the post, and means for clamping said flanged portion adjustably to the column including clamping bolts extending through enlarged apertures in the flange and screw-threaded into the column, and stop screws supported on the column for engagement with opposite sides of said flange to maintain the column laterally in adjusted position with relation to said latter post and the plug.

5. In a machine tool having a base, a work support, a rotary tool spindle and a vertically adjustable column for said spindle, the combination of a slide support for said column comprising two vertically extending cylindrical posts, stationary bearings formed on the base in which said posts are mounted to slide, means for securing the column rigidly to the upper portion of said posts, means for adjusting the position of the column laterally with relation to one of said posts to effect a slight angular adjustment of the column on the base about the vertical axis of the other of said posts, connections under the control of the operator for effecting a vertical adjustment in the position of the column and posts secured thereto comprising a rotatable feed screw supported against axial movement on the column, a stationary nut, and a support for said nut on the base arranged to permit a free adjustment of said nut on the base with the column about the axis of said latter post.

6. In a machine tool having a base, a work support, a rotary tool spindle and a vertically adjustable column for said spindle, the combination of a slide support for said column having relatively slideable parts comprising two vertically disposed cylindrical posts and cooperating sleeve bearings therefor, connections whereby the column is rigidly secured to one of the relatively slideable parts of the slide support comprising the posts and bearings, and the base is rigidly secured to the other of said relatively slideable parts, means for adjusting said connections to effect a slight angular adjustment of the column with relation to the base about the vertical axis of one of said posts, and means for controlling vertically the position of the column with relation to the base.

7. In a machine tool having a base, a work support, a rotary tool spindle and a vertically adjustable column for said spindle, the combination of a slide support for said column having relatively slideable parts including two vertically disposed cylindrical posts and cooperating sleeve bearings therefor, connections whereby the column is rigidly secured to one of the said relatively slideable parts of the slide support comprising the posts and bearings and the base is rigidly secured to the other of said relatively slideable parts of the slide support, means for adjusting laterally the connections between the column and base and one of said posts with its cooperating sleeve bearing to effect a slight angular adjustment of the column with relation to the base about the vertical axis of the other of said posts, and means under the control of the operator for adjusting vertically the position of the column with relation to the base.

WILLIAM H. FEENEY.